Patented May 16, 1933

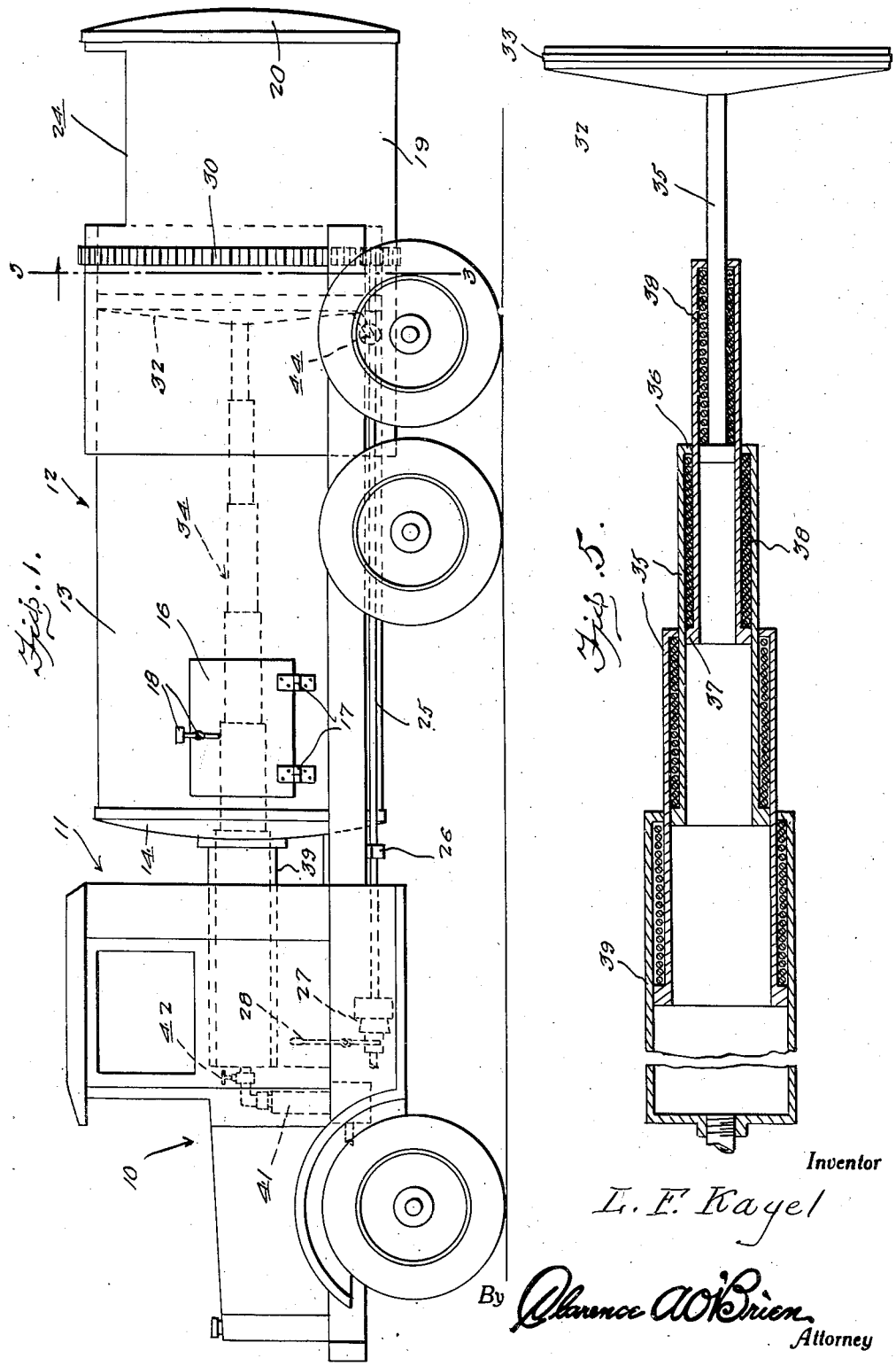

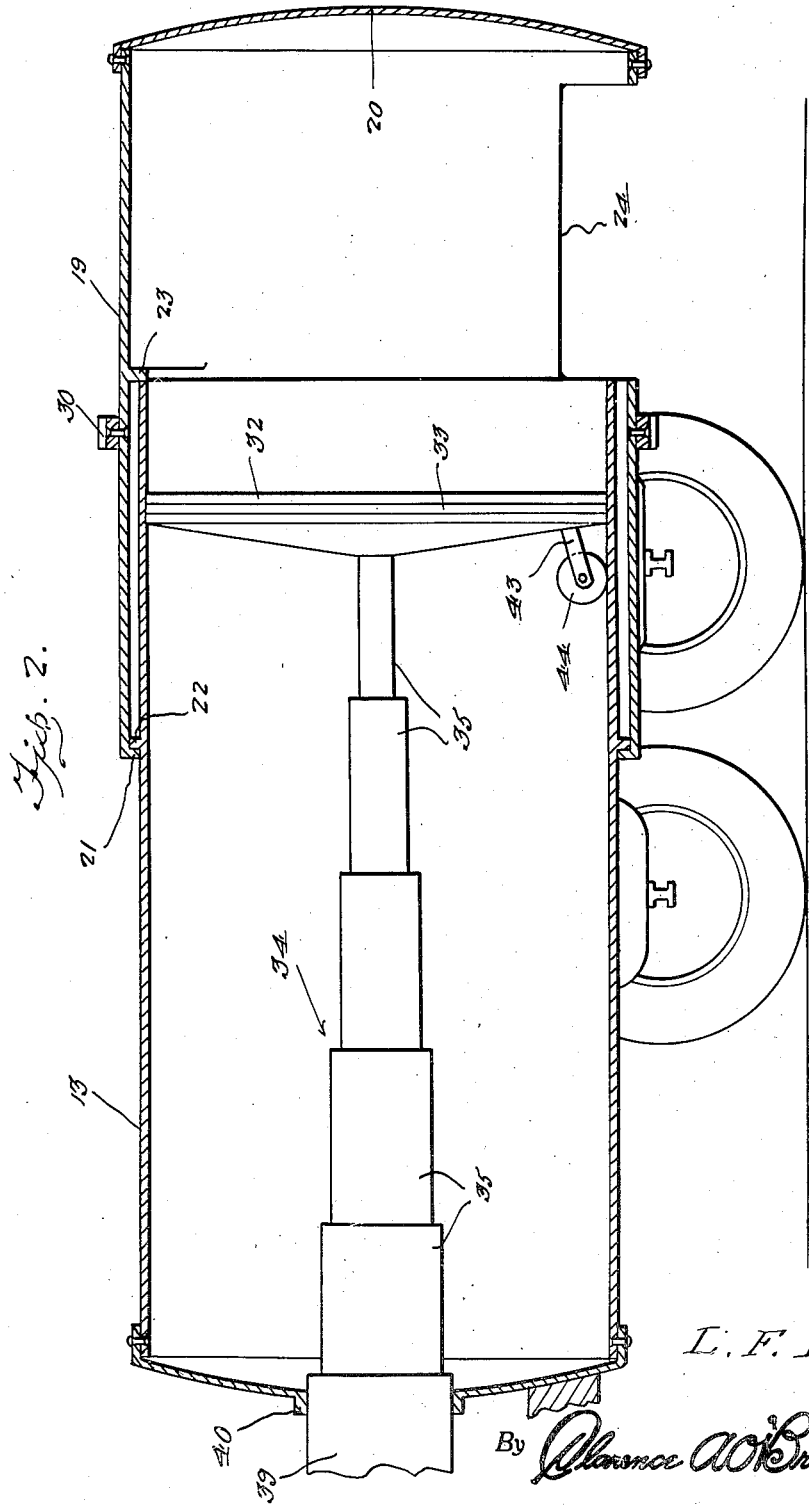

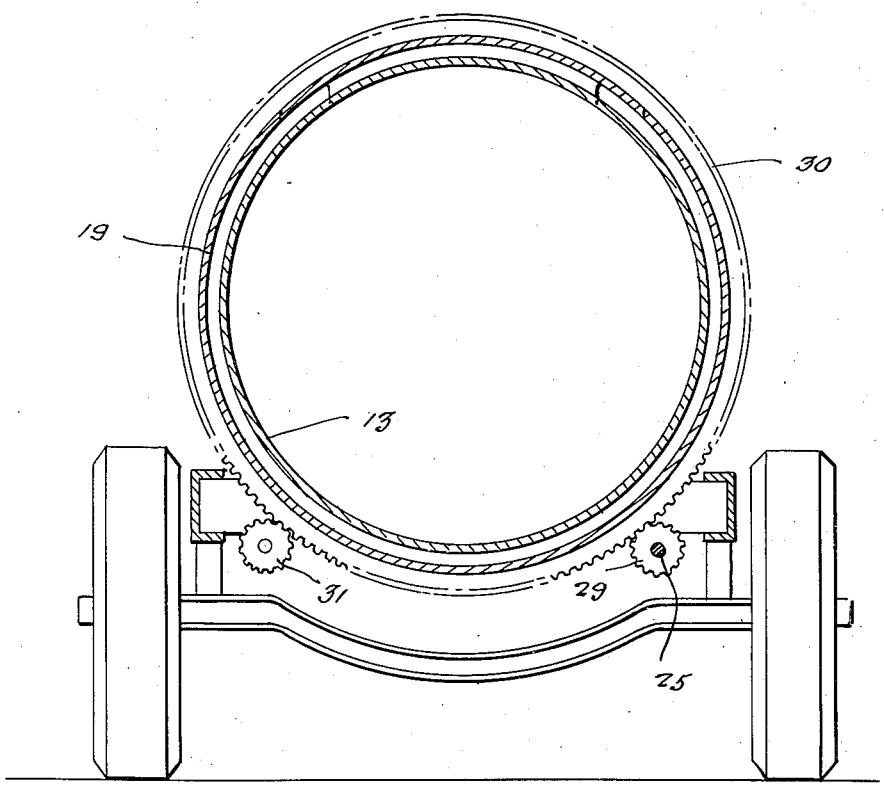
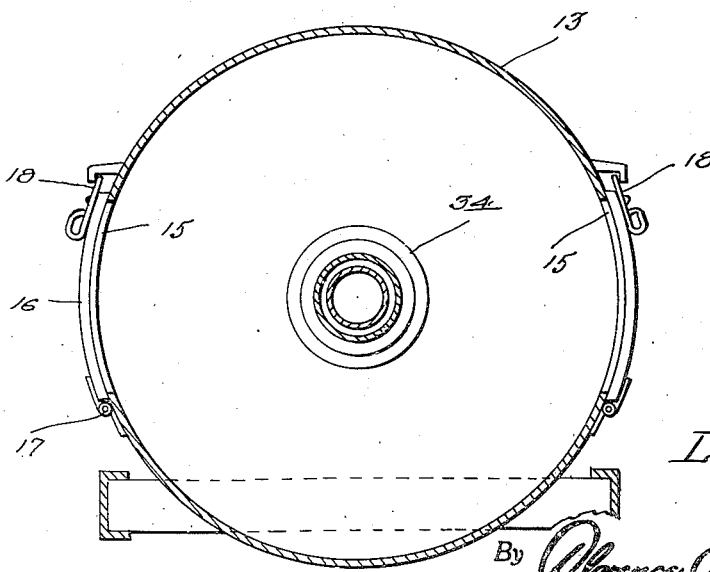

1,908,899

UNITED STATES PATENT OFFICE

LEWIS F. KAYEL, OF NORTH HEMPSTEAD, NEW YORK

VEHICLE FOR THE COLLECTION OF AND THE COMPRESSING OF REFUSE AND THE LIKE

Application filed November 29, 1932. Serial No. 644,900.

This invention relates broadly to wagon body constructions and has as its object the provision of an improved vehicle for collecting, transporting, compressing and discharging garbage and like refuse, although in actual practice it will be found that the vehicle can be as well used for collecting cotton in the field and for numerous other purposes as will readily present themselves.

The invention together with its numerous objects and advantages will be best understood from a study of the following description, taken in connection with the accompanying drawings wherein:

Figure 1 is a side elevational view of a vehicle embodying the features of the present invention, Figure 2 is a longitudinal sectional view through the vehicle body, the parts being shown in the position occupied when discharging refuse from the vehicle.

Figure 3 is a transverse sectional view taken substantially on the line 3—3 of Figure 1.

Figure 4 is a transverse sectional view through the main tank part of the wagon body and Figure 5 is a sectional elevational view of a follower or plunger mechanism for use in compressing the contents of the wagon and for discharging such contents from said wagon body.

Referring to the drawings by reference numerals it will be seen, from a study of Figure 1, that I, in carrying out the invention, make use of a truck, motor driven, the same being preferably a front wheel drive truck of existing type and designated generally by the reference character 10. Since, other than above mentioned, the particular type of truck is not of the essence of the invention, it is thought that a detail description thereof is unnecessary.

In carrying out the invention there is suitably supported on the chassis frame of the truck 10 rearwardly of the cabin 11 my improved wagon body, the same being designated generally by the reference character 12.

Wagon body 12 comprises a cylindrical tank 13 of suitable capacity fixedly mounted on the truck 10, and being provided, at the front end thereof with a conventional head 14. The rear end of the tank 13 is open as will be clear from a study of Figure 2. Adjacent its front end, the tank 13 on either or both sides thereof is provided with a filling opening 15 and for the openings 15 are provided doors 16 hinged at their lower edges as at 17. Suitable closure fasteners 18 are provided for releasably securing the doors 16 in closed condition (see Figure 4). The wagon body 12 further comprises a second section or secondary tank 19 that telescopes the rear end of the tank 13 as shown in Figure 2. The tank 19 is mounted for rotation about the tank 13 as an axis, and at the rear end thereof the tank 19 is provided with a closure head 20. At its open forward end tank 19 is provided with an inwardly directed annular flange 21 engaging an annular external flange 22 on the tank 13. Intermediate its ends the tank 19 is provided with an internal lug 23 engaging the rear end edge of tank 13. By reason of flanges 21, 22 and lug 23 tank 19 is restrained against longitudinal shifting movement relative to tank 13 but can be easily rotated about tank 13.

Adjacent its rear end the tank 19 in the peripheral wall thereof is provided with a discharge opening 24 and normally, the opening 24 is disposed at the top of the wagon body as shown in Figure 1. To discharge refuse from the wagon body tank 19 is rotated in a manner to be hereinafter set out for placing the opening 24 at the bottom of the wagon body as shown in Figure 2. For revolving the tank 19 there is provided a shaft 25 journalled in suitable bearings 26 provided on the chassis frame of the truck 10. At one end thereof the shaft 25 has a suitable drive connection with the power take off of the motor of the truck and such drive connection includes a suitable clutch 27 that can be readily operated from the drive seat through the medium of a control lever 28. At the rear end thereof there is suitably provided on the shaft 25 a pinion 29 that is in mesh with an external ring gear 30 provided on the tank 19 intermediate the ends of the tank. Also in mesh with the ring gear 30 is a suitably mounted idler gear 31 arranged opposite to the gear 29 as shown in Figure 3. Obviously when clutch 27 is engaged, by proper manipulation of lever 28, drive is transmitted to the shaft 25 and through the gears just mentioned, to the drum or tank 19 for rotating the latter relative to the tank 13 either to position the opening 24 at the top of the wagon body, as shown in Figure 1, or at the bottom of said body as shown in Figure 2.

Suitable hydraulic means is provided for compressing the contents of the wagon body, to force the refuse in the tank 13 rearwardly and away from the openings 15 so as not to interfere with subsequent filling operations and also to force the refuse in the tank 13 toward the rear thereof and through the opening 24, when the parts are in the position shown in Figure 2. Said means, in the present instance, consist of a plunger 32 arranged to reciprocate within the tank 13 and provided on its periphery with a ring 33 that has a close fit with the interior wall of the tank 13 for scraping the same free of any refuse having a tendency to cling thereto. The plunger 32 is mounted on one end of a collapsible rod 34. Rod 34 consists of a plurality of telescoping sections 35, and each of the sections is provided at one end with an inwardly directed flange 36, and at an inner end with an exterior flange 37.

Disposed about each section 35 is a coil spring 38 which at one end impinges against a flange 36 of an outer section, and at a relatively opposite end impinges against a flange 37 of the section about which the particular spring is disposed (see Figure 5). The springs 38 serve to normally urge the sections inwardly relative to one another or in other words to yieldably retain the rod 34 collapsed. As shown, and as is of course understood, the piston or plunger 32 is arranged on the outer end of one end section 35, while the section 35 which is of the largest diameter and is arranged at the other end of the rod 34 is slidably engaged within a cylindrical casing 39 that is suitably mounted within the cabin 11 of the truck as suggested by broken lines in Figure 1. The rear end of the casing 39 extends through a flange opening 40 provided in the head 14 of tank 13 as shown in Figure 2. A spring corresponding to the aforementioned springs 38 is also provided on the inner end of the said end section 35 of the rod for normally urging said end section inwardly with respect to the casing 39.

Preferably oil under pressure is used for extending the rod 34, and to this end, there is provided a suitable source of oil supply together with a suitable pump having suitable drive connection with the power take off of the motor of the truck; said pump being suggested by broken lines in Figure 1 and designated by the reference character 41. One side of the pump 41 is connected by suitable piping with the casing 39 and arranged in said piping is a manually controlled valve 42 also indicated by broken line in Figure 1, and this valve 42 is arranged in position convenient to the operator.

In actual practice, when the wagon body 12 is empty, rod 34 is in fully contracted position thus positioning the plunger or piston 32 forwardly with respect to the filling opening 15. The tank 19 is also positioned as to have the opening 24 disposed upwardly as shown in Figure 1. Each time the garbage or refuse is placed in the tank 13 through one of the openings 15, valve 42 is opened whereby oil is forced into the casing 39 to extend the rod 34 sufficiently to move the piston or plunger 32 rearwardly for forcing the contents of the tank 13 rearwardly with respect to the filling openings 15 after which the valve 42 is properly manipulated whereby the supply of oil is shut off, and as the rod 34 collapses under action of springs 38 thereby retracting the piston 32 so that the latter is again positioned forwardly with respect to the openings 15 the oil is forced from the rod through the valve to return either to the source of oil supply or to a reservoir (not shown) and as may be found desirable. The operation is again repeated after there has been a sufficient accumulation of garbage near the doors 15. It will thus be seen that by reason of the operation above mentioned, the portion of the tank around the openings 15 can be maintained clear, and the filling of the tank to its capacity easily accomplished.

When it is desired to discharge the contents of the wagon body 12, lever 28 is properly manipulated for engaging clutch 27 to drive shaft 25 and the tank 19, the tank rotating about the tank 13 from a position shown in Figure 1 to the position shown in Figure 2. With the opening 24 now disposed at the bottom of the truck body, an extension of rod 34 for shifting the plunger 32 rearwardly will of course force the refuse to the rear of the truck body 12 where it will discharge through the opening 24. When the contents of the truck have been fully discharged, rod 34 is retracted, and tank 19 revolved, moving from the position shown in Figure 2 to its normal position, or to the position shown in Figure 4. The truck is then ready for another complete loading.

Adjacent its lower edge plunger or piston 32 has extending therefrom a bracket 43 in which is journalled a roller 44 that is ridable along the bottom of the tank 13 and this latter arrangement aids in sustaining the weight of the plunger or piston 32.

Even though I have herein shown and described the preferred embodiment of the invention, it is to be understood that the same is susceptible of further changes, modifications and improvements coming within the scope of the appended claims.

Having thus described my invention, what I claim as new is:

1. In a power driven vehicle for collecting refuse, a fixed tank, a revoluble tank mounted on the fixed tank for rotation about the latter as an axis, said fixed tank being provided with a lateral charging opening, and said revoluble tank being provided with a lateral discharge opening, a plunger mounted to reciprocate in said fixed tank, means for reciprocating said plunger, and means for rotating said revoluble tank.

2. In a power driven vehicle for collecting refuse, a relatively fixed tank provided with charging openings, a revoluble member on one end of the tank substantially closing the latter, said revoluble member being provided with a lateral discharge opening, means for revolving said member, a plunger mounted to reciprocate within said tank, an extensible rod connected with said plunger, and means for extending and contracting said rod to reciprocate said plunger.

3. In a device of the character described, a relatively fixed cylindrical member, a revoluble cylindrical member mounted on said fixed member to rotate about the fixed member as an axis, each of said members being provided with a lateral aperture, inter-engaging means on said fixed member and on said revoluble member to restrain the latter against longitudinal movement, and a plunger mounted for reciprocation in said fixed cylindrical member.

In testimony whereof I affix my signature.

LEWIS F. KAYEL.